Dec. 13, 1949  R. A. FLORSHEIM  2,490,794
PHOTOGRAPHIC METHOD AND APPARATUS
Filed Sept. 10, 1945
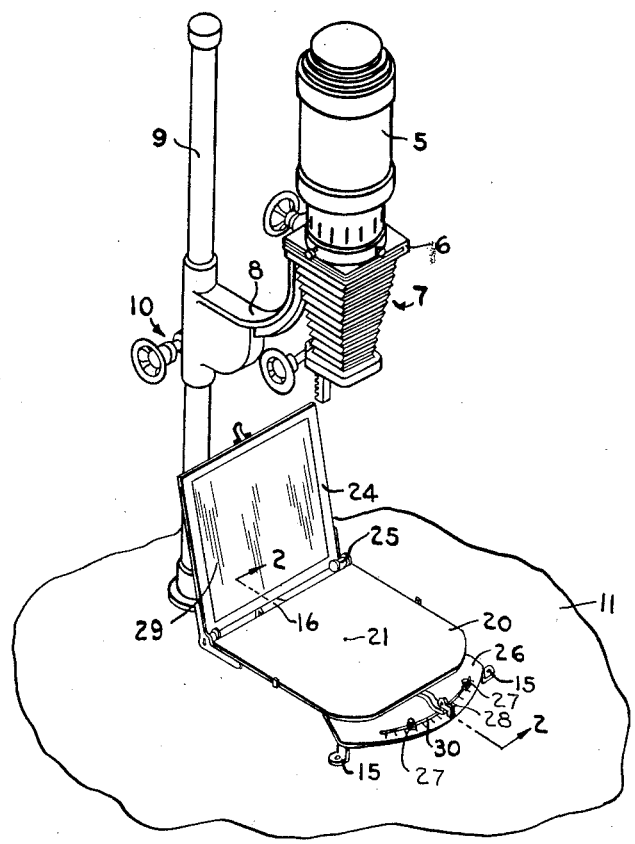
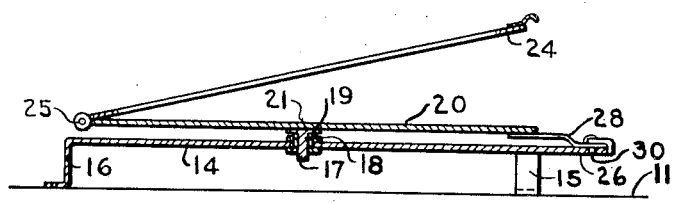
Inventor
Richard A. Florsheim
By Ralph L Chappell
Attorney Patented Dec. 13, 1949

2,490,794

UNITED STATES PATENT OFFICE 2,490,794

PHOTOGRAPHIC METHOD AND APPARATUS

Richard A. Florsheim, United States Navy

Application September 10, 1945, Serial No. 615,484

3 Claims. (Cl. 88—24)

(Granted under the act of March 3, 1883, as amended April 30, 1928; 370 O. G. 757)

This invention relates to a photographic method and apparatus, and more particularly to a photographic method and apparatus whereby the error due to the beam width of a radar may be introduced into a photograph simulating a plan position indicator type of radar presentation.

In a plan position indicator type of radar, a map of the area being scanned is presented on the cathode-ray tube screen in polar coordinates, with the antenna position occupying the center of the screen. The indicator tube is generally intensity modulated, with the sweep moving from the center of the screen radially outward. The sweep position is controlled by and synchronized with the antenna position and the return signals received by the radar apparatus are used to intensity modulate the cathode-ray beam to cause the target indication to appear as a bright spot on the screen at a point spaced from the center of the screen according to the range, and radially located according to the target position in azimuth.

The width of the radar beam causes a point target to appear on the indicator tube as a short arc, thus blurring the image in azimuth and, in effect, smearing the display. Since the angular beam width is constant, the linear width increases with the range and causes varying degrees of smearing, the distortion being greater with far objects than with near ones. In some types of radar apparatus, and particularly in radar apparatus operating on the longer wave lengths, the beam width may be as great as 30 degrees, thus substantially affecting the clarity of delineation in the radar presentation.

As described in my co-pending application Serial No. 615,483, filed September 10, 1945, a photographic simulation may be provided of the typical radar presentation which will be produced by a plan position indicator type of radar scanning a particular area, by locating a point source of illumination at a point with respect to a relief map substantially corresponding to the area under consideration, the location of the point source of illumination substantially corresponding to the radar antenna position. Such a photographic simulation while it is an accurate representation in other respects, does not take into consideration the important factor of beam width. However, the provision of a photograph which will take into account the factor of beam width is highly desirable to an efficient and useful utilization of the photographic simulation as described in my co-pending application. This will be readily apparent when it is realized that the primary method of utilization of such photographic simulations is by comparison with the actual radar presentation.

An object of the present invention is to provide a photographic method and apparatus whereby the factor of beam width may be introduced into a photographic simulation of a plan position type of radar presentation.

In accordance with one embodiment of this invention, a photographic transparency, which may be prepared as described in my copending application, hereinbefore referred to, is placed in a projection printing apparatus and the image thereof is projected on a photo-sensitive paper or film mounted on an easel. During the exposure the easel is moved in an arcuate path, the axis of which is aligned with the center of the projected image. The degree of movement is limited and corresponds to the degree of beam width which it is desired to introduce into the photograph.

Other objects and advantages of the present invention will be apparent from the following detailed description taken in conjunction with the drawings, wherein:

Fig. 1 is a perspective view of a photographic projection printing apparatus having an easel constructed in accordance with one embodiment of this invention associated therewith; and, Fig. 2 is a detail, sectional view of the easel taken substantially along the line 2—2 of Fig. 1.

Referring now to the drawings, and particularly to Fig. 1 thereof it will be seen that a conventional photographic projection printing apparatus is there illustrated comprising a lamp housing 5, which is mounted on the upper surface of a substantially rectangular negative carrier 6, beneath which is mounted a lens housing and bellows assembly designated generally as 7. The lamp housing, negative carrier and lens housing are mounted on a bracket 88 which is carried by a vertically disposed post 9 and the bracket may be moved up or down the post in accordance with the desired size of the projected image. The bracket 8 is locked in position on the post 9 by a clamping device designated generally as 10. A base 11, such as a table top, serves as a support for the apparatus.

In employing a projection printing apparatus such as that described, a negative is placed in the negative carrier and the image thereof projected onto a suitably sensitized film or paper which may be placed either on the top of the table 11 or in a suitable easel, as is well known in the art.

In accordance with the present invention, an easel of unique design is employed whereby during the exposure the film or paper may be rotated about an axis aligned with the axis of the projected image to introduce into a photographic simulation of the presentation of a plan position indicator type of radar the effect of beam width. The easel of this invention comprises a flat base plate 14, which is supported on the table 11 by two pedestal members 15 disposed at the two forward corners thereof, as viewed in Fig. 1, and a third pedestal member 16 mounted at the rear of the plate 14. A short stub shaft 17 is mounted in the center portion of the plate 14 and extends upwardly therefrom, being supported therein by a sleeve bearing 18 which extends transversely through the plate 14 and is suitably secured thereto. The upper end of the stub shaft 17 is provided with a flange 19 on the upper side of which is securely mounted a second plate 20 of suitable width and length to accommodate photo sensitized film or paper of the size required. A short pin 21 may be located on the surface of the plate 20 immediately above the center of the stub shaft 17 to aid in aligning the easel with the axis of projection and centering the paper or film on the easel.

In employing this easel the paper or film is laid on the surface of the plate 20 and pressed downward to cause the pin 21 to extend through the center of the paper and then a frame 24 having an interior width and length slightly less than that of the film or paper and which is pivotally supported by a hinge 25 located along the rear edge of the plate 20 is pivoted downward to press against the upper side of the paper or film and thus to retain it in position on the plate 20. The frame 24 may be provided with a glass plate 29 to aid in holding the film or paper flat.

During the exposure, the plate 20 and associated frame 24 are moved in an arcuate path about the stub shaft 17, the axis of which is previously aligned with the axis of projection. In order to facilitate moving the plate 20 a handle 28 is mounted on the forward portion of the plate 20 and extends over a flanged portion 26 integrally formed with the base plate 14. This flanged portion may be suitably calibrated and a pair of spaced stop members 27 adjustably mounted in an arcuate slot 30 formed in the flanged portion 26 beneath the handle 28 and extending substantially concentrically with respect to the axis of the shaft 17. The stop members serve to limit the degree of rotation of the plate 20 to correspond to a desired beam width.

Ordinarily, employing this easel it has been found desirable to use a sufficiently long exposure to permit the plate 20 to be oscillated back and forth a number of times during the exposure in order to obtain a uniform exposure.

While but one embodiment of this invention has been shown and described, it will be understood that many changes and modifications may be made therein without departing from the spirit or scope of the present invention.

The invention shown and described herein may be manufactured or used by or for the Government of the United States of America for governmental purposes without the payment of any royalties thereon or therefor.

What is claimed is:

1. A method of introducing the factor of beam width into a photographic simulation of a plan position indicator type of radar presentation comprising projecting an image of a plan position indicator photographic simulation on a photosensitive material and then oscillating the material about the axis of projection, the degree of oscillation corresponding to the beam width which it is desired to simulate.

2. In a method of simulating photographically the presentation of a plan position indicator type of radar wherein a photographic transparency has been prepared by photographing a relief map having a point source of illumination located thereon at a point corresponding to the position of the radar, the steps of projecting an image of said transparency on a photo sensitized material and oscillating the material about the axis of projection, the degree of oscillation corresponding to the beam width which it is desired to simulate.

3. In an apparatus for introducing the factor of beam width into a photographic simulation of a plan position indicator type of presentation, a photographic projection printing apparatus, an easel plate for supporting and rotating a sheet of photosensitive material associated with said apparatus, a pointed pin projecting from the surface of said easel plate normal to the plate and coaxial with the center of rotation to aid in centering the sheet of photosensitive material and establish on the sheet a record mark showing the center of rotation, and adjustable positive stop means for limiting the degree of rotation of the plate.

RICHARD A. FLORSHEIM.

REFERENCES CITED

The following references are of record in the file of this patent:

UNITED STATES PATENTS

| Number | Name | Date |
| --- | --- | --- |
| 1,113,549 | Franke | Oct. 13, 1914 |
| 1,911,142 | Cahill | May 23, 1933 |
| 2,135,074 | Grant | Nov. 1, 1938 |

FOREIGN PATENTS

| Number | Country | Date |
| --- | --- | --- |
| 293,562 | Great Britain | July 12, 1928 |